(12) United States Patent
Tobin, Jr. et al.

(10) Patent No.: US 8,304,737 B2
(45) Date of Patent: Nov. 6, 2012

(54) APPARATUS AND METHOD TO ACHIEVE HIGH-RESOLUTION MICROSCOPY WITH NON-DIFFRACTING OR REFRACTING RADIATION

(75) Inventors: Kenneth W. Tobin, Jr., Harriman, TN (US); Philip R. Bingham, Knoxville, TN (US); Ayman I. Hawari, Cary, NC (US)

(73) Assignee: UT-Battelle, LLC, Oak Ridge, TN (US)

( * ) Notice: Subject to any disclaimer, the term of this patent is extended or adjusted under 35 U.S.C. 154(b) by 403 days.

(21) Appl. No.: 12/572,536

(22) Filed: Oct. 2, 2009

(65) Prior Publication Data

US 2011/0079725 A1    Apr. 7, 2011

(51) Int. Cl.
G01T 1/16 (2006.01)
(52) U.S. Cl. .................................. 250/363.06
(58) Field of Classification Search ............. 250/363.06; 378/2
See application file for complete search history.

(56) References Cited

U.S. PATENT DOCUMENTS

| 6,747,274 | B2 * | 6/2004 | Li | 250/288 |
| 2004/0079890 | A1 * | 4/2004 | Fraser et al. | 250/370.11 |
| 2008/0095298 | A1 * | 4/2008 | Shefsky | 378/2 |

OTHER PUBLICATIONS

Fenimore et al., "Coded aperture imaging with uniformly redundant arrays", Applied Optics, Feb. 1, 1978, pp. 337-347, vol. 17, No. 3.
Fenimore et al., "Random array grid collimators", Rev. Sci. Instrum., Apr. 1980, pp. 445-453, 51(4).
Fenimore et al., "Uniformly redundant arrays: digital reconstruction methods", Applied Options, May 15, 1981, pp. 1858-1864, vol. 20, No. 10.
Gaskill, "Linear Systems, Fourier Transforms, and Options", 1978, pp. 50-57.
Grünauer, "Image deconvolution and coded masks in neutron radiography", Nuclear Instruments & Methods in Physics Research—Section A, 2005, pp. 342-352.
Nadjmi et al., "Flashing Tomosynthesis—A New Tomographic Method", Neuroradiology, 1980, pp. 113-117, 19.
Vassilieva et al., "Method for reducing background artifacts from images in single-photon emission computed tomography with a uniformly redundant array coded aperture", Applied Optics, Mar. 1, 2002, pp. 1454-1461, vol. 41, No. 7.

* cited by examiner

*Primary Examiner* — Mark R Gaworecki
(74) *Attorney, Agent, or Firm* — Scully, Scott, Murphy & Presser, P.C.

(57) ABSTRACT

An imaging system employing a coded aperture mask having multiple pinholes is provided. The coded aperture mask is placed at a radiation source to pass the radiation through. The radiation impinges on, and passes through an object, which alters the radiation by absorption and/or scattering. Upon passing through the object, the radiation is detected at a detector plane to form an encoded image, which includes information on the absorption and/or scattering caused by the material and structural attributes of the object. The encoded image is decoded to provide a reconstructed image of the object. Because the coded aperture mask includes multiple pinholes, the radiation intensity is greater than a comparable system employing a single pinhole, thereby enabling a higher resolution. Further, the decoding of the encoded image can be performed to generate multiple images of the object at different distances from the detector plane. Methods and programs for operating the imaging system are also disclosed.

34 Claims, 10 Drawing Sheets

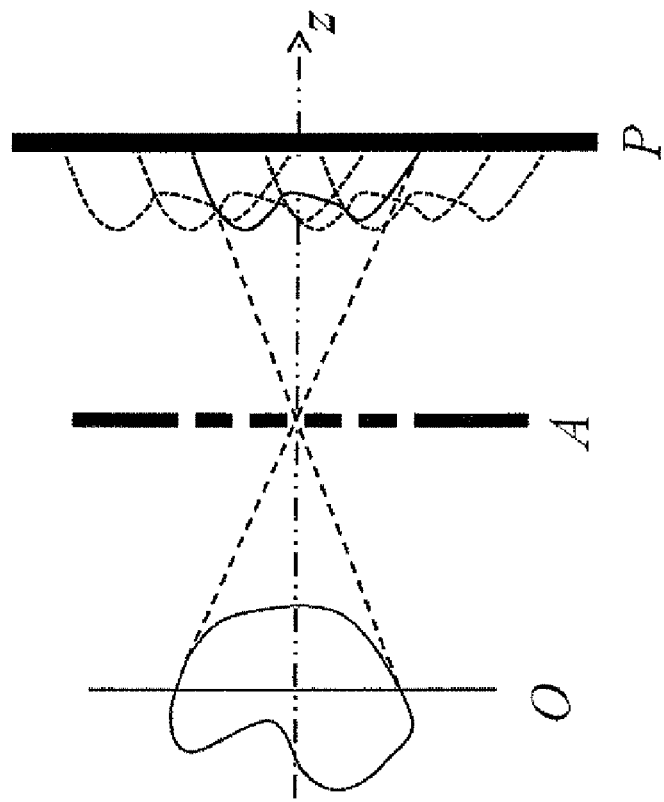
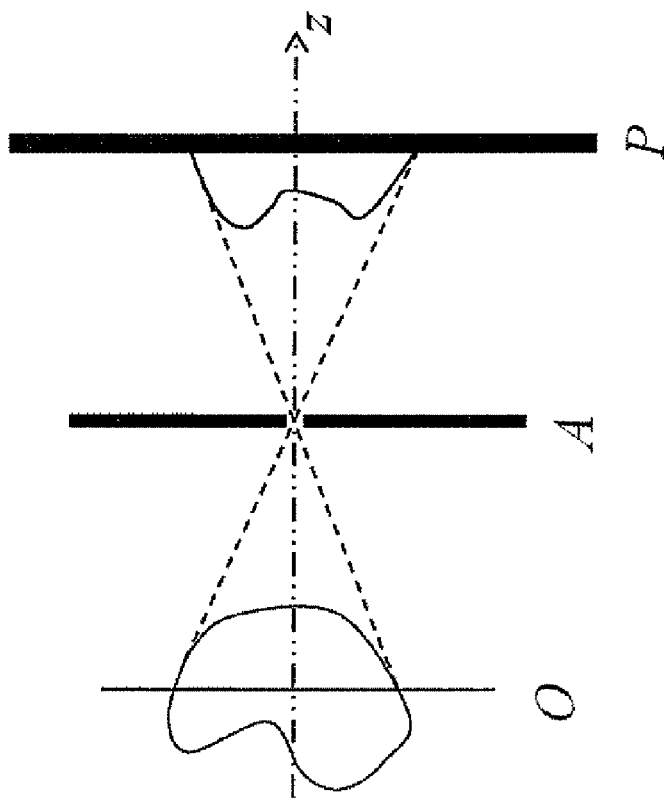

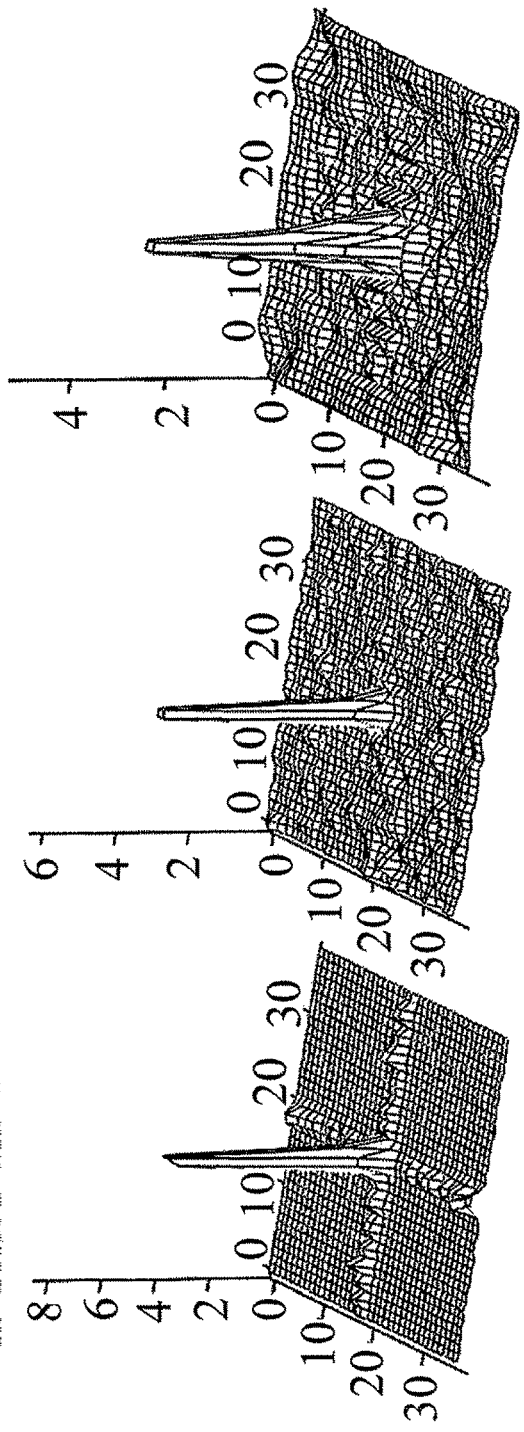
FIG. 3A  FIG. 3B  FIG. 3C

APPARATUS AND METHOD TO ACHIEVE HIGH-RESOLUTION MICROSCOPY WITH NON-DIFFRACTING OR REFRACTING RADIATION

STATEMENT REGARDING FEDERALLY SPONSORED RESEARCH OR DEVELOPMENT

This invention was made with United States government support under Prime Contract No. DE-AC05-00OR22725 awarded by the U.S. Department of Energy. The United States government has certain rights in this invention.

FIELD OF THE INVENTION

The present invention relates to the field of imaging devices employing non-diffracting or refracting radiation, a method of operating the same, and a program to perform the operation of the same.

BACKGROUND OF THE INVENTION

Typical imaging systems employ the principles for a single pinhole-style camera. Referring to FIG. 1A, a schematic diagram illustrating the geometry of a conventional pinhole camera is shown. Such a conventional pinhole camera is configured for imaging of an object O emitting or reflecting radiation. In other words, the object O is the source of the emitting or reflecting radiation. The radiation is collected through the pinhole in the aperture mask A, and an image is formed at an image plane P. The image plane P is located on the opposite side of the object O relative to the aperture mask A. The direction of the radiation is represented by the direction labeled z, or the z-axis. The image formed at the image plane P does not provide any depth resolution along the z-axis because the information recorded at the image plane P is formed through a single imaging pinhole and contains all surface and internal structure of the object projected onto a 2-dimensional image plane, P.

Referring to FIG. 1B, a schematic diagram illustrates the geometry of a conventional camera employing an aperture, A, containing multiple pinholes. This camera is also configured for imaging of an object emitting or reflecting radiation, but is different from the single pinhole-style camera of FIG. 1A in that this camera employs a multi-pinhole coded aperture system instead of a single pinhole aperture.

A coded aperture system exhibits the resolution of a pinhole-style camera but with collection efficiency proportional to the number of pinholes in the aperture. The aperture is a collection of pinholes in a specified pattern. Coded aperture imaging systems represent a class of cameras that are heavily investigated today for applications ranging from national security to biomedical imaging.

For these applications, the system is designed to capture the radiation emitted from the object O. The object O could be a radioactive dispersive device, an astronomical gamma star, or an organ containing a medical isotope. The image formed at the detector plane and the reconstructed image is described according to the following relationships:

$$P(r)=O(r)*A(r) \text{ image formation} \quad (1)$$

$$\hat{O}(r)=P(r)*G(r) \text{ image reconstruction} \quad (2)$$

$$\hat{O}(r)=O(r)*(A(r)*G(r)) \text{ substitution of Eq. (1) into Eq. (2)} \quad (3)$$

$$\hat{O}(r) \approx O(r) \text{ iff } A(r)*G(r) \approx \delta(r) \text{ aperture condition} \quad (4)$$

where "*" is the convolution operator and r=(x,y) is a two-dimensional spatial coordinate in the object, aperture, and imaging planes. The convolution operator is defined by $(f*g)(x)=\int f(\alpha)g(x-\alpha)d\alpha$. For the purposes of description of the system in FIG. 1B, an article by Fenimore, E. E. and T. M. Cannon, titled "Coded Aperture Imaging with Uniformly Redundant Arrays," Applied Optics 17(3): 337 (1978) is incorporated herein by reference. The aperture in FIG. 1B exhibits the property that $A(r)*G(r) \approx \delta(r)$, where $\delta(r)$ is the Dirac delta function. Note that the decoding aperture, G(r), is defined based on the pattern of A(r) to achieve balanced decoding as follows, $$G(r) \equiv \begin{cases} 1 & \text{if } A(r)=1 \\ -1 & \text{if } A(r)=0 \end{cases} \quad (5)$$

Many imaging devices employ a different geometry than the geometry shown in FIGS. 1A and 1B. An object emitting radiation imaged with a single pinhole provides radiation that passes through the hole and impinges on the detector plane. The radiation is detected by a radiation sensor in the detector plane to generate an image of the object.

Imaging efficiency is a concern for many imaging devices employing a radiation source because the radiation source typically generates a radiation of limited intensity. Where generation of radiation of sufficient intensity is a challenge, imaging devices employing such radiation tend to suffer from poor spatial resolution. Such radiation sources include X-ray sources, neutron sources, gamma ray sources, proton sources, etc.

Many radiation sources with limited intensity fall in the category of non-diffracting radiation sources or refracting radiation sources. Non-diffracting radiation sources refer to radiation sources that provide a radiation that does not substantially diffract. Diffraction is an inherent property of all waves that interact at the interface of differing materials, or a vacuum and material interface. Electromagnetic radiation has a wavelength given by c/f, in which c is the speed of light in the medium and f is the frequency of the radiation. Radiations of a material wave has a wavelength given by h/p, in which h is Plank's constant and p is the momentum of the radiated particle. The wavelength of the material wave is also called the de Broglie wavelength.

The diffractive property of a wave is manifested when the dimensions of geometric features in the path of a radiation is comparable with the wavelength of the radiation. Thus, even though all radiations are diffracting in the strictest sense, the diffractive properties are displayed only when the dimensions of geometric features are on the order of, or less than, the wavelength of the radiation. Otherwise, the diffractive properties of the radiation is insignificant and unobservable, and the radiation does not "substantially diffract," i.e., the radiation is considered a non-diffracting radiation. For example, X-ray, neutrons, gamma ray, and protons are employed in imaging devices in which the aperture is much greater than the wavelength of the radiation.

Refraction is another inherent property of radiation. Refraction is the change in direction of a wave due to a change in the phase velocity across different mediums. When a radiation is refracted by an object, the presence of the object can be indirectly detected by a change in the image.

Since imaging efficiency has a direct impact on resolution of images, difficulty in obtaining high radiation intensity from various non-diffracting or refracting radiation sources limits resolution of images obtained using such radiation sources. Particularly, biomedical imaging devices employing such a radiation source of insufficient intensity generate a low resolution image of a patient. For example, the best neutron radiography systems throughout the world today achieve spatial resolutions no better than 100 microns because it is not possible to focus, i.e., through diffraction and refraction, a beam of neutrons to achieve a high efficiency of collection. Neutron radiography has long been known to provide complementary, non-destructive capabilities to x-ray and gamma-ray imaging methods. Neutron imaging with conventional reactor-based sources enables the interrogation of complex, multi-component systems for many applications including nuclear material non-destructive testing, characterization of flight control surfaces on aircraft, testing of heat transfer in porous materials, heat exchanger systems, and biological systems. Newer, intense neutron sources from spallation facilities are providing the potential to interrogate time and energy-dependent phenomena as well.

Thus, spatial resolution achieved by conventional neutron radiography is limited today by the sample rate at the detector and by the limited intensity of neutron beams. Because neutron beams are marginally-diffracting or refracting at microscopic and macroscopic scales, neutron optics that can magnify or de-magnify (i.e., focus) imaged objects are difficult to create and require expensive designs and materials.

Such a limitation on resolution adversely affects performance of imaging devices. Therefore, there is a need for an imaging device that provides enhanced resolution despite limited radiation intensity from a non-diffracting or refracting radiation source. Further, there is a need for a method for operating such imaging devices and a program designed to perform the operation of such imaging devices.

SUMMARY OF THE INVENTION

In the present invention, an imaging system employing a coded aperture mask having multiple pinholes is provided. The coded aperture mask is placed at a radiation source to encode the radiation through. The radiation impinges on, and passes through a non-radioactive or self-emitting object, which alters the radiation by absorption and/or elastic or inelastic scattering. Upon passing through the object, the radiation is detected at a detector plane to form an encoded image, which includes information on the modulation of the encoded source beam caused by the object-beam interaction. The encoded image is decoded digitally using an algorithm implemented on a computer to provide a reconstructed image of the object. Because the coded aperture mask includes multiple pinholes, the radiation collection efficiency is greater than a comparable system employing a single pinhole, thereby enabling a more intense signal for a given exposure or recording time. Further, the decoding of the encoded image can be performed to generate multiple planar images of the object at different distances from the detector plane.

According to an aspect of the present invention, an imaging apparatus includes a coded aperture mask having a set of multiple holes and configured to pass radiation from a radiation source through the set of multiple holes; and a radiation detector located at an image plane at an opposite side of the radiation source relative to the coded aperture mask and configured to generate an image of an object placed between the coded aperture and the radiation detector.

In one embodiment, the imaging apparatus further includes an image decoder unit that constructs at least one decoded image based on the image, wherein the at least one decoded image is representative of a physical shape of the object.

In another embodiment, the at least one decoded image includes a decoded image that is representative of a two-dimensional cross-sectional area of the object in a plane parallel to the imaging plane.

In even another embodiment, the at least one decoded image includes multiple decoded images, wherein each of the multiple decoded images is representative of a two-dimensional cross-sectional area of the object in a plane parallel to the imaging plane and located at different distances from the imaging plane.

In yet another embodiment, the image decoder unit is configured to generate a three-dimensional image of the object based on the multiple decoded images.

In still another embodiment, the coded aperture mask includes an aperture represented by a uniform redundant array of pinholes, a random pinhole array, or a Fresnel zone array of pinholes, or any other type of two-dimensional organizational array of pinholes that can produce the appropriate imaging system response.

In further another embodiment, the apparatus is configured to allow removal of the coded aperture mask and to allow insertion of another coded aperture mask to accomplish a sequential recording of the encoded source radiation modulated by the object being imaged.

According to another aspect of the present invention, a method of operating an imaging apparatus is provided. The method includes providing an imaging apparatus including a radiation source, a coded aperture mask having a set of multiple holes and configured to pass radiation from the radiation source through the set of multiple holes, and a radiation detector located at an image plane; and generating an image at the radiation detector of an object located between the coded aperture and the radiation detector.

In one embodiment, the method further includes constructing at least one decoded image based on the image, wherein the at least one decoded image is representative of a physical shape of the object.

In another embodiment, the at least one decoded image includes a decoded image that is representative of a two-dimensional cross-sectional area of the object in a plane parallel to the imaging plane.

In even another embodiment, the method further includes constructing multiple decoded images, wherein each of the multiple decoded images is representative of a two-dimensional cross-sectional area of the object in a plane parallel to the imaging plane and located at different distances from the imaging plane.

In yet another embodiment, the method further includes generating a three-dimensional image of the object based on the multiple decoded images.

In still another embodiment, the at least one decoded image is constructed upon execution of a program on a microprocessor that is embedded in an image decoder unit.

In a further embodiment, the method further includes: replacing the coded aperture mask with a second coded aperture mask having a second set of multiple holes and configured to pass radiation from the radiation source through the second set of multiple holes; and generating a second image at the radiation detector of the object.

In an even further embodiment, the method further includes constructing at least one decoded image based on the image and the second image, wherein the at least one decoded image is representative of a physical shape of the object.

In a yet further embodiment, the method further includes reducing background noise in the at least one decoded image by comparing a first decoded imaged constructed from the image and a second decoded image constructed from the second image.

In a still further embodiment, the second set of multiple holes in the second coded aperture mask and the set of multiple holes in the coded aperture mask have complementary patterns designed to reduce spurious noise in the reconstructed image by removing counts at the detector that are due to background radiation sources that are not associated directly with the encoded source or the object being imaged.

According to yet another aspect of the present invention, a machine-readable data storage device embodying a program of machine-executable instructions to perform a method of operating an imaging apparatus is provided. The imaging apparatus includes a radiation source, a coded aperture mask having multiple apertures and configured to pass radiation from the radiation source through the multiple apertures, and a radiation detector located at an image plane. The method includes generating an image at the radiation detector of an object located between the coded aperture and the radiation detector.

In one embodiment, the machine-readable data storage device is a portable memory device that is readable by a computer.

In another embodiment, the method further includes constructing at least one decoded image based on the image, and wherein the at least one decoded image is representative of a physical shape of the object.

In even another embodiment, the method further includes generating a second image at the radiation detector of the object, wherein the second image is generated after replacing the coded aperture mask with a second coded aperture mask having a second set of multiple holes.

BRIEF DESCRIPTION OF THE DRAWINGS

It is noted that proportions of various elements in the accompanying figures are not drawn to scale to enable clear illustration of elements having smaller dimensions relative to other elements having larger dimensions.

FIG. 1A is a schematic diagram illustrating the geometry of a conventional pinhole camera configured for imaging of an object emitting or reflecting radiation.

FIG. 1B is a schematic diagram illustrating the geometry of a conventional coded aperture camera employing multiple pinholes and configured for imaging of an object emitting or reflecting radiation.

FIG. 3A shows an exemplary pattern of holes in a uniformly redundant array (URA) for a coded aperture mask (picture above) and an accompanying intensity pattern developed through digital reconstruction of the radiation measured at the detector plane in the case of a point object to be imaged (picture below) according to the present invention.

FIG. 3B shows an exemplary pattern of holes in a random pinhole array (RPA) for a coded aperture mask (picture above) and an accompanying intensity pattern developed through digital reconstruction of the radiation measured at the detector plane in the case of a point object to be imaged (picture below) according to the present invention.

FIG. 3C shows an exemplary pattern of holes in a Fresnel zone plate (FZP) for a coded aperture mask (picture above) and an accompanying intensity pattern developed through digital reconstruction of the radiation measured at the detector in the case of a point object to be imaged (picture below) according to the present invention.

DETAILED DESCRIPTION OF THE INVENTION

Figure 2:
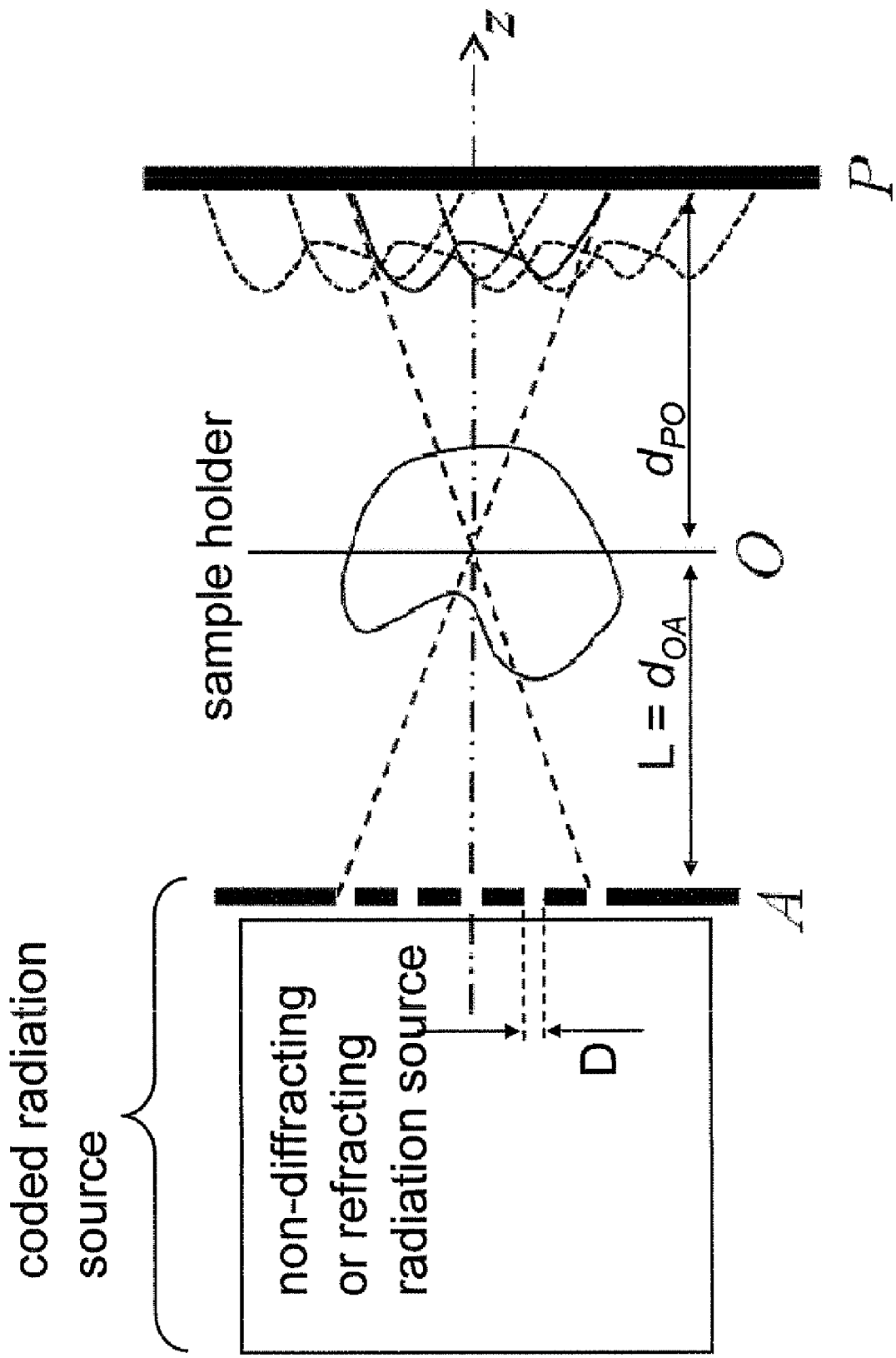
FIG. 2 is a schematic diagram illustrating the geometry of the imaging apparatus employing an encoded radiation source and radiation transmitted through, and attenuated by, an object before forming an image at a radiation detector located at an image plane according to the present invention.

As stated above, the present invention relates to an imaging apparatus, a method of operating the same, and a program to perform the operation of the same. The present invention is now described in detail with accompanying figures. It is noted that like and corresponding elements mentioned herein and illustrated in the drawings are referred to by like reference numerals.

The present invention is described employing neutron radiation. However, the imaging apparatus of the present invention can be employed for any other type of non-diffracting radiation or refracting radiation including, but not limited to, X-ray, gamma ray, ultraviolet radiation, light in the visible spectral range (400 nm-800 nm wavelength), protons, alpha particles, electrons, charged ions, and neutral particles.

Referring to FIG. 2, a schematic diagram illustrates the geometry of the imaging apparatus of the present invention. The imaging apparatus employs a "coded radiation source" that includes a non-diffracting or refracting radiation source and a coded aperture mask A. In practice, the coded aperture mask A can be attachable to one end of the non-diffracting or refracting radiation source. The attachment can be done, for example, by a guided linear or rotational movement or by manual placement. The coded aperture mask A includes a plurality of holes to let the radiation from the non-diffracting or refracting radiation source exit. Typical lateral dimensions of each hole in the coded aperture mask A is herein referred to as a hole width D.

The radiation from the non-diffracting or refracting radiation source is subsequently transmitted through, and attenuated by, an object O before forming an image at a radiation detector located at an image plane P. A radiation detector is placed at the image plane P to generate an image of the object. The image at the radiation detector is an encoded image due to the encoded nature of the radiation from the coded radiation source. The distance between the coded aperture mask A and the object O is herein referred to as an object-to-aperture distance $d_{OA}$ or L. The distance between the image plane P and the object O is herein referred to as an image-plane-to-object distance $d_{PO}$. The z-axis is along the direction perpendicular to the coded aperture mask A. The origin of the z-axis is center of the coded aperture mask A and increases with distance in the direction toward the image plane P. The origin of the 2-dimensional coordinate vector r=(x,y) is the z-axis.

The image formed at the detector plane, P, is similarly given by, $$P(r) = \int_Z A\left(\frac{r}{m_A(z)}\right) * O\left(\frac{r}{m_O(z)}, z\right) \frac{dz}{(d_{PO}+d_{OA}-z)^2}, \quad (6)$$

wherein the following modified object and aperture magnifications are employed to simplify the expression, $$m_A(z) = \frac{d_{PO}}{d_{OA}-z} \text{ and } m_O(z) = 1 + \frac{d_{PO}}{d_{OA}-z}. \quad (7)$$

The functional forms for A(r) and O(r) are as described in Fenimore, E. E. and T. M. Cannon, titled "Coded Aperture Imaging with Uniformly Redundant Arrays," Applied Optics 17(3): 337 (1978).

In the present invention, the radiation source is a coded radiation source (or an "encoded radiation source") formed by integrating the coded aperture mask with the non-diffracting or refracting radiation source. The radiation from the encoded source produces an encoding of the object at the detector plane.

Referring to FIGS. 3A-3C, exemplary patterns of holes for the coded aperture mask are shown with corresponding intensity pattern (shown immediate below each exemplary hole pattern) at the radiation detector for a digitally reconstructed point object according to the present invention. The reconstructed intensity patterns show the impulse response of the corresponding coded aperture imaging system due to the imaging of a single point object, i.e., the imaging system employing the corresponding type of coded aperture mask. FIG. 3A is an exemplary pattern of holes in a uniformly redundant array (URA) for the coded aperture mask (picture above) and an accompanying reconstructed intensity pattern in the case of a point object to be imaged (graph below). FIG. 3B is an exemplary pattern of holes in a random pinhole array (RPA) for the coded aperture mask (picture above) and an accompanying reconstructed intensity pattern in the case of a point object to be imaged (graph below). FIG. 3C shows an exemplary pattern of holes in a Fresnel zone plate (FZP) for a coded aperture mask (picture above) and an accompanying reconstructed intensity pattern in the case of a point object to be imaged (graph below).

Figure 4B:
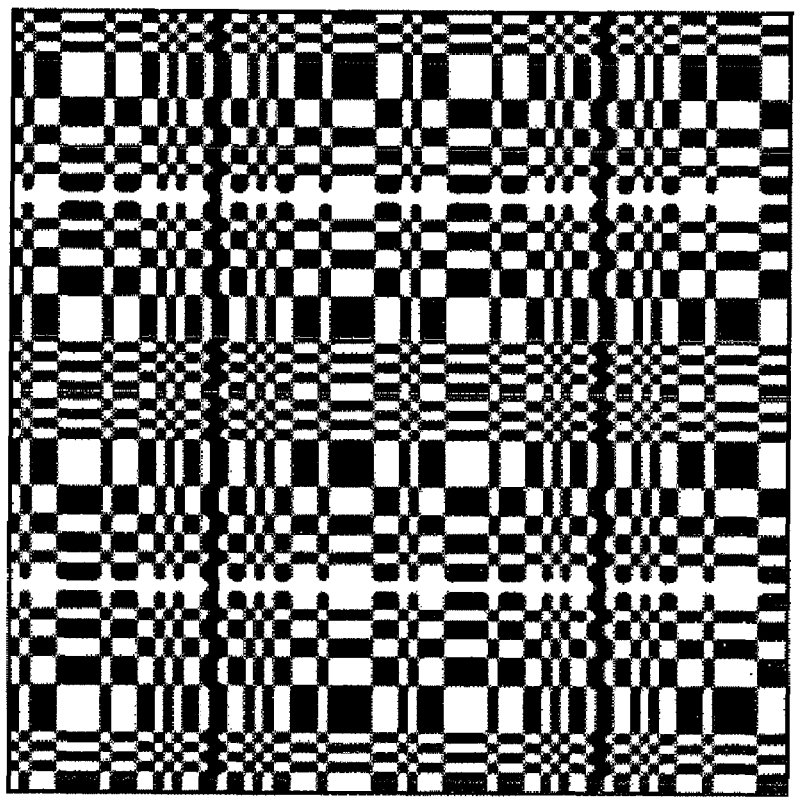
FIG. 4B shows an exemplary pattern of holes in a uniformly redundant array (URA) for a coded anti-aperture mask according to the present invention. The pattern of holes in FIG. 4B is the complementary pattern of the pattern of holes in FIG. 4A.
Figure 4A:
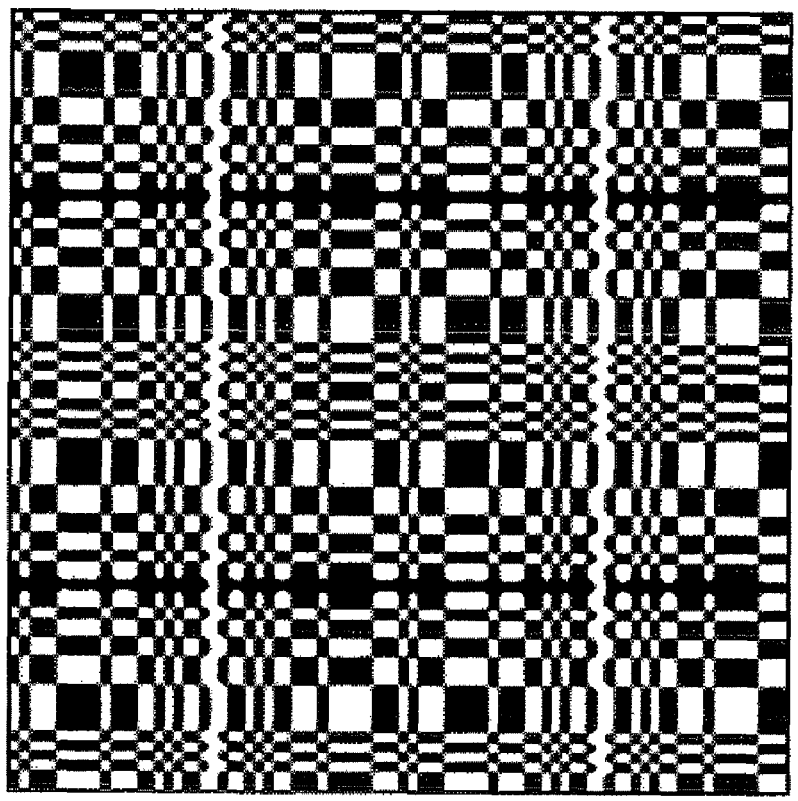
FIG. 4A shows an exemplary pattern of holes in a uniformly redundant array (URA) for a coded aperture mask according to the present invention.

Referring to FIGS. 4A and 4B, one instantiation of a pair of a coded aperture mask and a coded anti-aperture mask are shown, which can be employed in the imaging system of the present invention. FIG. 4A shows an exemplary pattern of holes in a uniformly redundant array (URA) for a coded aperture mask according to the present invention. FIG. 4B shows an exemplary pattern of holes in a uniformly redundant array (URA) for a coded anti-aperture mask according to the present invention. The pattern of holes in FIG. 4B is the complementary pattern of the pattern of holes in FIG. 4A.

The coded aperture mask employs an aperture for the set of holes, and the coded anti-aperture mask employs an anti-aperture for the set of holes. The anti-aperture is an aperture that has openings for every opaque area in the corresponding aperture and has an opaque area for every hole in the corresponding aperture. By independently collecting an encoded image of an object through each aperture, the two encoded images can be combined to mitigate background noise that degrades the quality of the imaged object.

Figure 5:
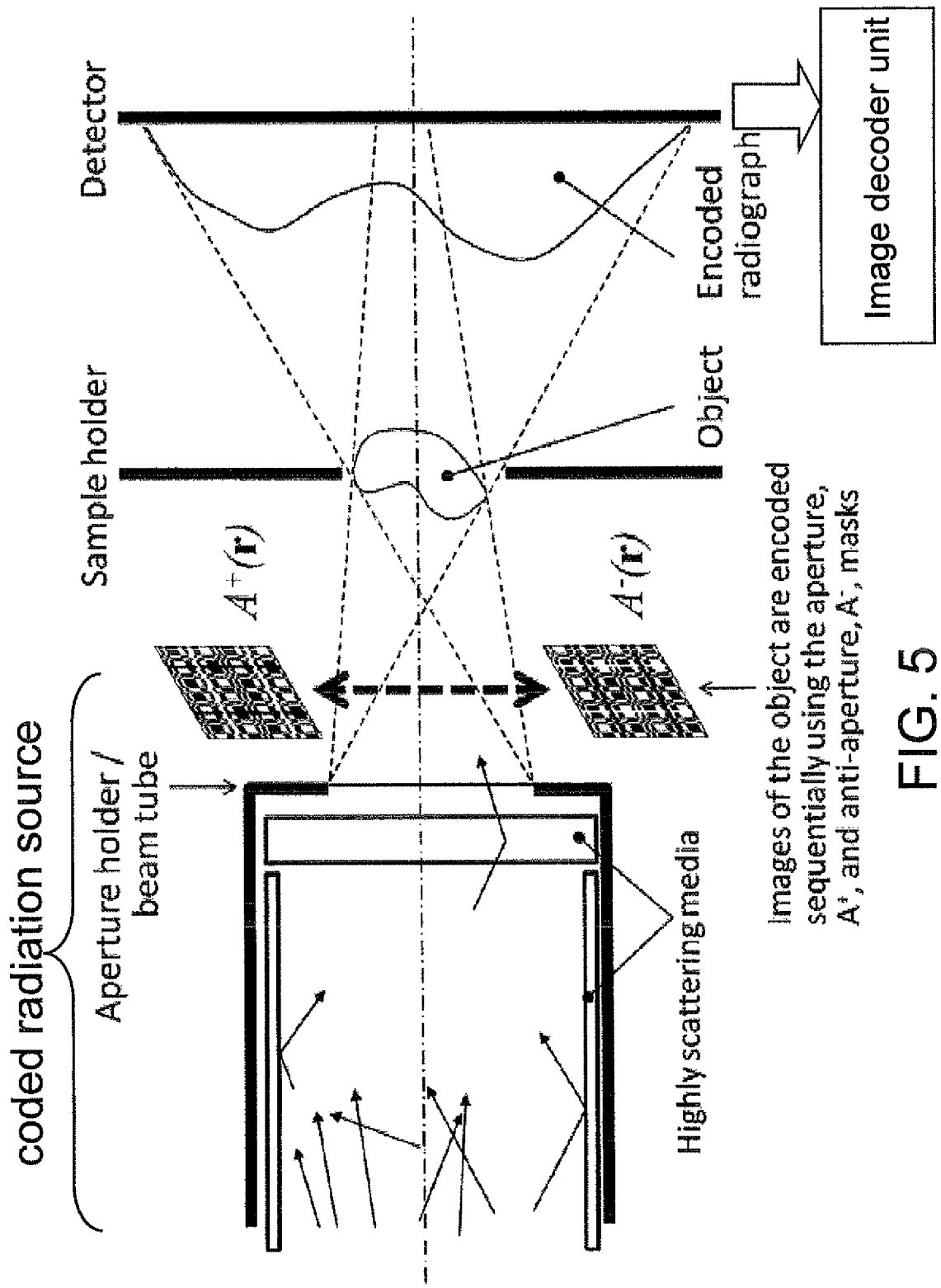
FIG. 5 is a schematic vertical cross-sectional view of a first exemplary imaging apparatus according to the present invention.

Referring to FIG. 5, a schematic vertical cross-sectional view of a first exemplary imaging apparatus of the present invention is shown. The first exemplary imaging apparatus includes a radiation source, a coded aperture mask, and a radiation detector. The radiation source and the coded aperture mask collective form a coded radiation source. A sample holder is located between the coded radiation source and the radiation detector, and holds an object.

The radiation source may generate a radiation of neutrons, protons, alpha particles, charged ions, neutral atoms, electrons, products of radioactive decay, X-ray, or gamma ray. The radiation source may be a nuclear reactor, a radioactive material, an X-ray source, or a particle accelerator. In one embodiment, the radiation source emits neutrons and the radiation is a beam of neutrons. In this case, the radiation source may be a beam tube that provides neutrons that exit out of the end of the tube. The radiation source may include a radiation shield. In this case, the radiation shield and the coded aperture may collectively enclose the radiation source to reduce background radiation from the radiation source. The radiation source may include at least one scattering media that alters direction of said radiation within the radiation source to enhance dose of the radiation directed to the coded aperture mask. The at least one scattering media is preferably a highly scattering media for the radiation, which may be deuterated water, graphite, or beryllium in the case of neutron radiation.

The coded aperture mask has a set of multiple holes, and is configured to pass radiation from the radiation source through the set of multiple holes. The coded aperture mask is held in place by an aperture holder, which can be integrally formed with the radiation source or can be attached to an end of the radiation source. The coded aperture mask may include a uniform redundant array of apertures, a random pinhole array of apertures, a Fresnel zone array of apertures described above, or any other type of two-dimensional array of holes organized to produce the appropriate response of the system to object encoding and decoding. The imaging apparatus may be configured to allow removal of the coded aperture mask and to allow insertion of another coded aperture mask. "Lateral dimension" of a hole herein refers to the least dimension between a pair of opposing sides of the hole that are parallel to the other or having parallel tangents. Each hole in the set of multiple holes can have a lateral dimension from 1 micron to 1 mm, and typically from 3 micron to 100 microns, although lesser and greater lateral widths are also contemplated herein.

The sample holder is optional. If present, the sample holder is located between the coded aperture mask and said radiation detector and configured to hold said object. The sample holder will also limit the field of view of the radiation detector from the radiation to reduce detection of stray radiation. Preferably, the sample holder includes a material that absorbs the radiation so that the radiation is blocked by the sample holder from the radiation detector. In some embodiments, the sample holder may not be present especially when the object is bulky. The object can be an inanimate structure or a living being (including humans).

The radiation detector located on the opposite side of the radiation source relative to the coded aperture mask, and is configured to generate an image of the object. The image of the object is an encoded image, which is not a replica of any cross-sectional area or any physical shape of the object. This is because a coded radiation source is employed in the imaging apparatus of the present invention instead of a point source. The recorded signal at the radiation detector is the encoded image, of which the encoding is generated by the pattern of holes in the aperture. The reconstruction, or decoding, of the encoded image requires the knowledge of the pattern of holes in the aperture. Typically, the encoded image at the radiation detector is a digital image, i.e., an image in digital format that can be readily analyzed with a computer program.

Various types of detectors may be employed as the radiation detector of the present invention. For example, the radiation detector can be a scintillator array configured to detect the radiation. Alternately, the radiation detector can be a charge coupled detector (CCD) or an optical digital camera. Any other radiation detector configured to detect spatial distribution of the radiation may also be employed. Not necessarily but preferably, the surface of the radiation detector that is exposed to the radiation is parallel to the coded aperture mask.

The distance between the coded radiation source and the object can be from 1.5 cm to 15 m, and typically from 15 cm to 3 m, although lesser and greater distances are also contemplated herein. The distance between the object and the radiation detector can be from 1.5 cm to 15 m, and typically from 15 cm to 3 m, although lesser and greater distances are also contemplated herein. All distances involving the object are measured from the center of gravity of the object. The distance between the radiation detector and the coded aperture mask can be from 3 cm to 30 m, although lesser and greater distances are also contemplated herein. The ratio of the distance between the coded radiation source and the object to the distance between the object and the radiation detector can be from about $1/3$ to 3, and preferably close to 1.0, although lesser and greater ratios are also contemplated herein.

The first exemplary imaging apparatus further includes and image decoder unit. The image decoder unit constructs at least one decoded image based on the image that the radiation detector generates. The at least one decoded image is representative of a physical shape of the object. The image decoder unit typically includes a microprocessor that automatically decodes the image to construct the at least one decoded image upon execution of a program. The microprocessor may be embedded in the image decoder unit. The image decoder unit can be a dedicated computer, or can be a general purpose computer equipped with the program for performing data convolution on the image from the radiation detector to reconstruct the at least one decoded image of the object.

The at least one decoded image may includes a decoded image that is representative of a two-dimensional cross-sectional area of the object in a plane parallel to the imaging plane, i.e., in a plane with a constant z-value. The z-value for construction of each decoded image can be set at differently to correspond to any plane between the radiation detector and the coded aperture mask. Preferably, the z-values selected for construction of decoded images corresponds to planes that include at least one point of the object, i.e., between the maximum value of z and the minimum value of z for the set of all points within the volume of the object. Thus, multiple decoded images can be constructed such that each of the multiple decoded images is representative of a two-dimensional cross-sectional area of the object in a plane parallel to the imaging plane and located at different distances from the imaging plane. By assembling such multiple decoded images, the image decoder unit can generate a three-dimensional image of the object based on the multiple decoded images from the encoded image generated at the radiation detector.

Thus, during the operation of the first exemplary imaging apparatus, the radiation source generates non-diffracting or refracting radiation. The radiation passes through the coded aperture mask and the object, and generates an image at the radiation detector of the object. The image at the radiation detector is decoded by the image decoder unit to construct at least one decoded image based on the image at the radiation detector. In this case, the image decoder unit performs calculation directly on the data representing the image at the radiation detector to generate the at least one decoded image, i.e., the image decoder unit generates the at least one decoded image directly from the image at the radiation detector.

In one embodiment of the present invention, serial images can be generated at the radiation detector by serially employing an aperture and anti-aperture pair for the pattern of the coded aperture mask for the purpose noise mitigation. Images of the object are encoded sequentially using a first coded aperture mask (also referred to as "the aperture mask" or "the $A^+$ mask" herein) and a second coded aperture mask (also referred to as "the anti-aperture mask" or "the $A^-$ mask" herein). The first coded aperture mask has a first set of multiple holes and configured to pass radiation from the radiation source through the first set of multiple holes. The second coded aperture mask has a second set of multiple holes and configured to pass radiation from the radiation source through the second set of multiple holes. The second set of multiple holes in the second coded aperture mask and the first set of multiple holes in the first coded aperture mask have complementary patterns such as the pair of patterns shown in FIGS. 4A and 4B.

A first image is generated at the radiation source employing the first coded aperture mask as described above. Then, the first coded aperture mask is replaced with a second coded aperture to generate a second image at the radiation source employing the same methods as described above, the only difference being the replacement of the first coded aperture mask with the second coded aperture mask. The two encoded images at the detector independently collected from the aperture and anti-aperture masks are combined through summation prior to digital reconstruction. Digital reconstruction of the summation will subsequently produce a decoded image representative of the physical shape of the object. The decoded image of the object constructed in this manner will contain reduced background noise and therefore improved reconstruction fidelity. Multiple decoded images, each representative of a two-dimensional cross-sectional area of the object in a plane parallel to the imaging plane and located at different distances from the imaging plane, can be constructed as describe above. Further, a three-dimensional image of the object can be generated based on the multiple decoded images as discussed above.

The construction of the least one decoded image and/or the three-dimensional image can be performed automatically by a program in the image decoder unit, which may include a computer. In general, any machine-readable data storage device embodying (i.e., storing) a program of machine-executable instructions can be utilized to operate the imaging apparatus of the present invention. The machine-readable data storage device can be a portable memory device that is readable by a computer. Such portable memory device can be a compact disk (CD), digital video disk (DVD), any other disk readable by a disk driver embedded or externally connected to a computer, a memory stick, or any other portable storage medium currently available or yet to be invented. Alternately, the machine-readable data storage device can be an embedded component of a computer such as a hard disk or a flash drive of a computer.

Preferably, the program includes instructions for constructing at least one decoded image based on an image at the radiation detector, or based on a pair of a first and second images obtained with a first and second coded aperture masks, such that the at least one decoded image is representative of a physical shape of the object. Further, the program may include instructions for constructing multiple decoded images and/or a three-dimensional image of the object as discussed above.

In case the aperture holder is configured to automatically replace a first coded aperture mask with a second coded aperture mask, for example, by a liner and/or rotational movement of the first and second coded aperture masks, the program may include instructions to effect such a replacement of coded aperture masks. In this case, the program preferably includes instructions for automatically generating a first image and a second image for the corresponding first and second coded aperture masks, respectively.

Figure 6:
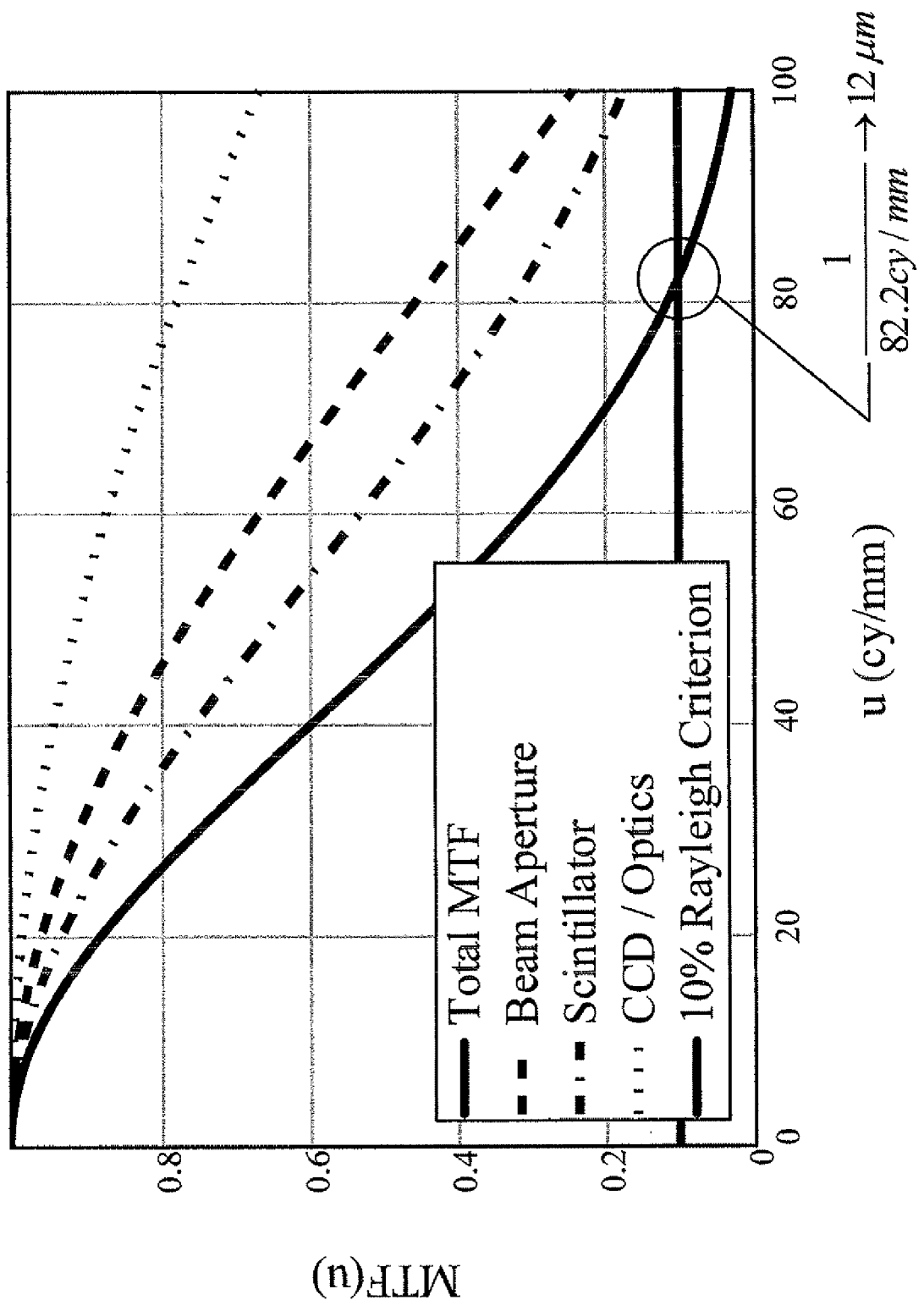
FIG. 6 is an example of a normalized modulus of the Fourier transform of the impulse response (a Modulation Transfer Function (MTF) curve) for a radiography system according to the present invention.

Referring to FIG. 6, an example of a normalized modulus of the Fourier transform of the impulse response (an MTF curve) is shown for a radiography system according to the present invention. The curves show the transfer functions for the various system components under a particular design as described in the text for the configuration in FIG. 8.

Design of the coded aperture system can be accomplished through modeling of the system impulse response function and associated modulation transfer function (MTF). In a linear shift-invariant (LSI) radiography system, the image response, I(x), can be described as a convolution of the neutron flux at the detector, $\phi(x)$, with an impulse function, h(x), as $I(x)=\phi(x)*h(x)$. Pages 50-57, 150, and 151 of the book by Gaskill, J. D. titled "Linear Systems, Fourier Transforms, and Optics," and published by John Wiley & Sons, Inc. in 1978 are incorporated herein by reference. The impulse response function accounts for the degrading effects of L/D, the detector system including optical diffusion in the scintillator, $\sigma$; the band-limiting characteristics of the optical components, and the CCD sample rate, $\Delta s$. The total impulse response can be decomposed into the major system component impulses as, $h(x)=h_{CA}(x)*h_o(x)*h_{CCD}(x)$. These components of the system can be modeled using the following idealized functions for the coded aperture, scintillator, and CCD camera respectively, $$h(x) = \left[A_\delta(x'') * G_\delta(x'') * rect\left(\frac{x''}{D}\right)\right] * Gauss\left(\frac{x'}{\sigma}\right) * rect\left(\frac{x}{\Delta s}\right), \quad (7)$$

where rect(•) is a rectangle function and Gauss(•) is a Gaussian function as defined in Gaskill. The functions $A\delta(x)$ and $G\delta(x)$ define the encoding and decoding aperture hole locations respectively. Each aperture hole is represented by a rectangle function of width D. $\delta(x)*G\delta(x)=\delta(x)$ for a properly defined aperture pattern.

The normalized modulus of the Fourier transform of the impulse response is the MTF, defined as $MTF(u)=|F\{h(x)\}|/|F\{h(0)\}|=|H(u)|/|H(0)|$, where H(u) is the system transfer function. The MTF describes the magnitude of the frequency response of the system and is useful for depicting and quantifying system resolution. From Eq. 5, we can analytically produce MTF(u) through Fourier transformation and coordinate mapping to yield, $$MTF(u) = \left|sinc\left(\frac{dM_{CCD}}{\frac{L}{D}}u\right) \cdot Gauss(\sigma M_{CCD}u) \cdot sinc(\Delta su)\right| \quad (8)$$

where sinc (x)=sin (x)/x. Note that this expression has been put into a form explicitly containing the L/D ratio.

Specifically, FIG. 6 illustrates an example of how this MTF analysis can used for a representative system with parameters L/D=1,500, D=0.5 mm, $\sigma$=30 μm, $\Delta s$=0.15 μm, and $M_{CCD}$=0.25. At the Rayleigh criterion of 10% MTF, the expected system resolution is 12 microns at the detector plane.

An aperture and anti-aperture pair can be constructed to sequentially measure the neutron field passing through the test object in the imaging apparatus of the present invention based on such results of System Modeling and Design. The aperture/anti-aperture patterns can be constructed on a single linear platform that can be repositioned remotely to collect the image sequences prior to reconstruction. This approach can greatly reduce noise in the reconstructed image. Noise in the image formation system, n(r), is primarily additive at the detector as $P(r)=O(r)*A(r)+n(r)$. By forming a sequential aperture/anti-aperture pair at the detector defined by $P^+(r)=O(r)*A^+(r)$ and $P^-(r)=O(r)*A^-(r)$ respectively, the reconstruction noise can be strongly mitigated by subtracting the detector responses prior to correlation with the decoding aperture function as follows:

$$\begin{aligned}O_R(r) &= [P^+(r) - P^-(r)] * G^+(r) \quad (9)\\ &= [O(r)*A^+(r) + n(r) - (O(r)*A^-(r) + n(r))] * G^+(r)\\ &= O(r)*A^+(r)*G^+(r) + O(r)*A^-(r)*G^-(r)\\ &= O_R^+(r) + O_R^-(r),\end{aligned}$$

where we have made use of the relationship $G^+(r)=-G^-(r)$. This shows how the reconstructed image, $O_R$, is reduced of the indicated background noise, n, through combination of the aperture and anti-aperture image, $P^+$ and $P^-$.

Figure 7:
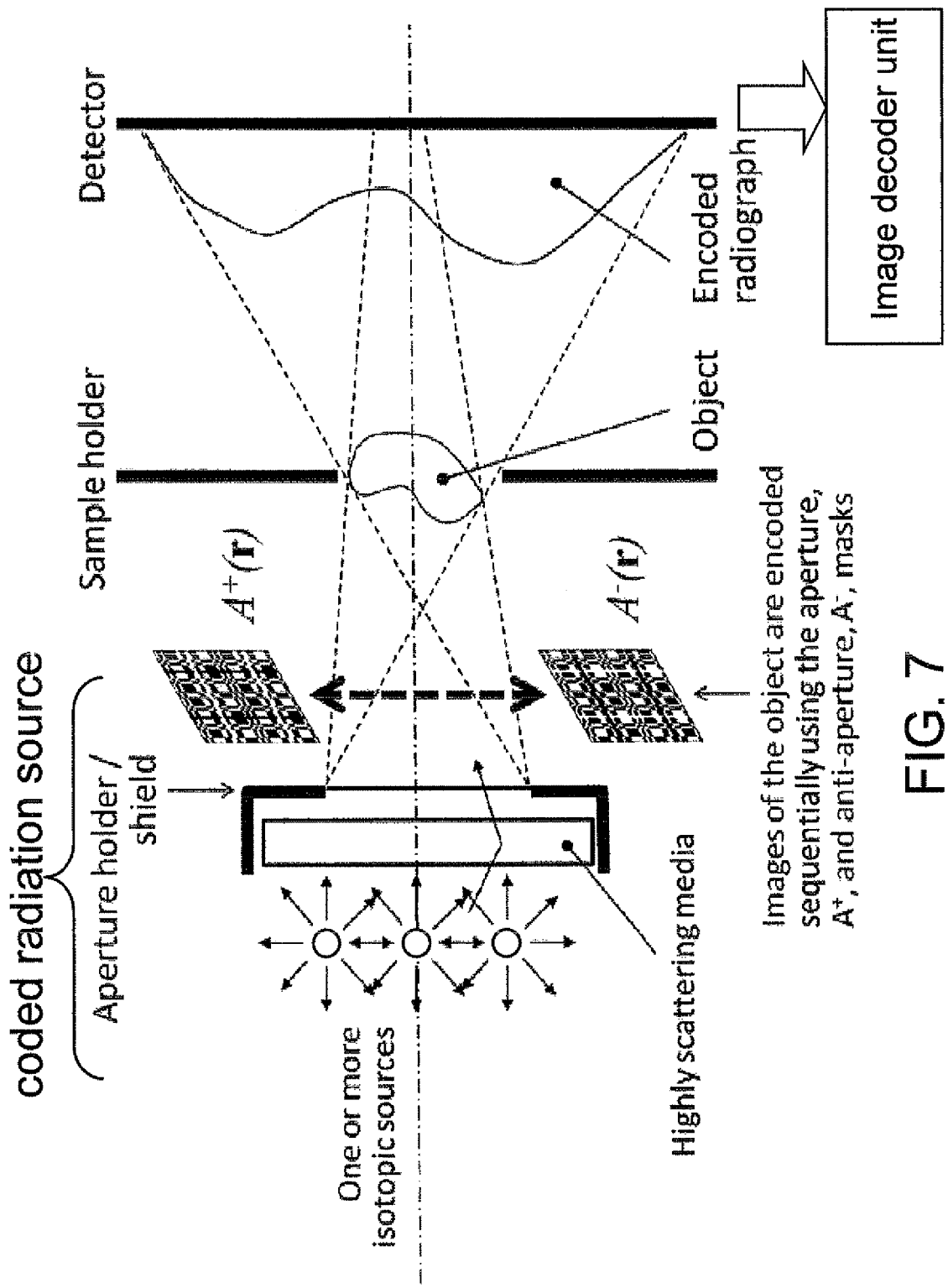
FIG. 7 is a schematic vertical cross-sectional view of a second exemplary imaging apparatus according to the present invention.

Referring to FIG. 7, a schematic vertical cross-sectional view of a second exemplary imaging apparatus according to the present invention is shown. In this configuration, use of a radioactive source as the radiation source is illustrated. Specifically, one or more isotopic source can be employed as the source of a neutron or other particle or gamma beam. The second exemplary imaging apparatus may be suitable for radiography employed for medical diagnosis.

Figure 8:
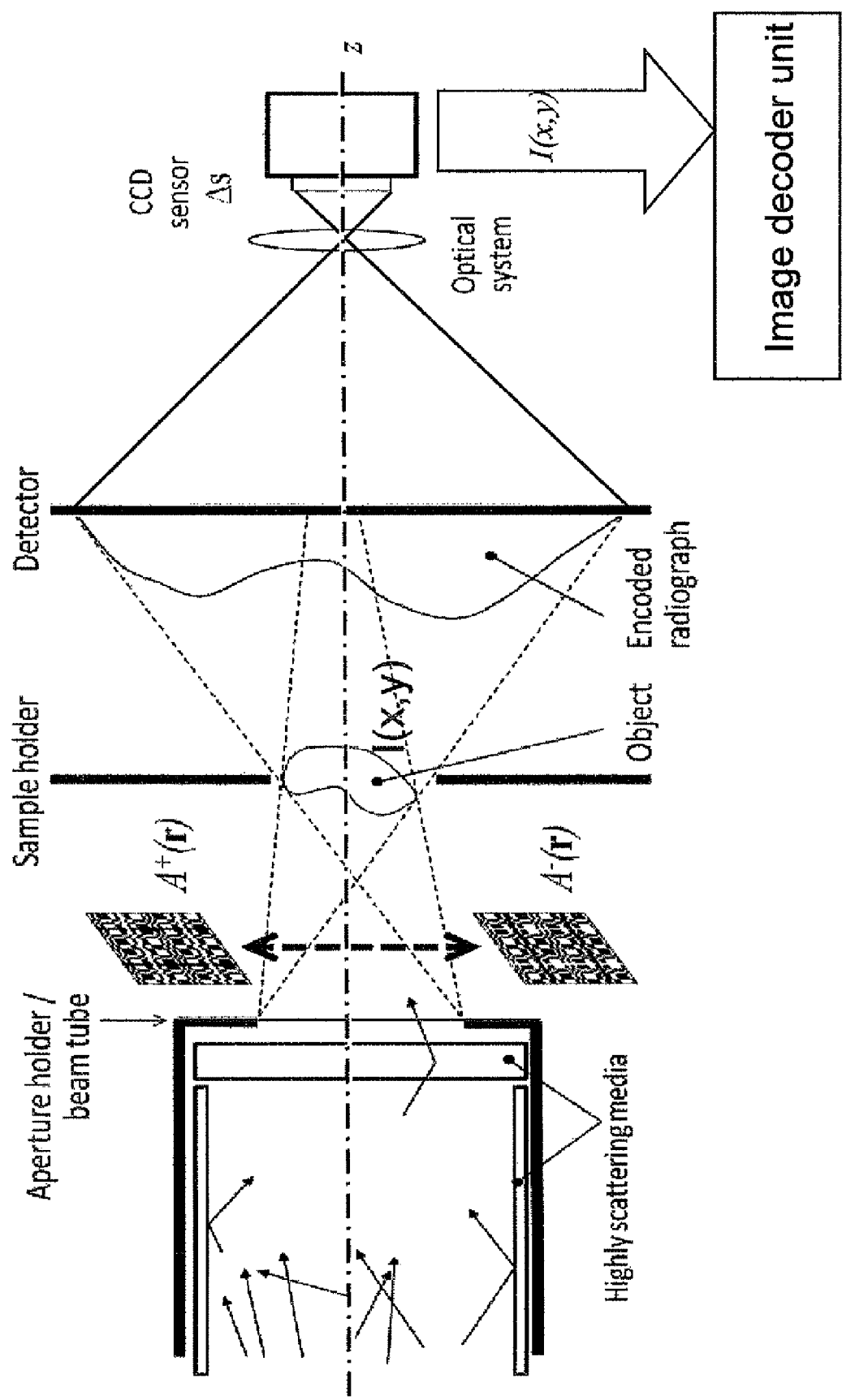
FIG. 8 is a schematic vertical cross-sectional view of a third exemplary imaging apparatus according to the present invention.

Referring to FIG. 8, a schematic vertical cross-sectional view of a third exemplary imaging apparatus according to the present invention is shown. Instead of limiting the radiation detector to the type that directly generates a digital image, the third exemplary imaging apparatus can employ any type of radiation detector that is a radiation converter, i.e., any type of screen that generates light upon irradiation. A typical radiation converter is a scintillating screen. Particularly, the radiation detector can display the image in an analog format such as an encoded analog radiograph displayed on the backside of the radiation detector. For example, the radiation detector can be a screen that is coated with a fluorescent material that is activated by the impinging radiation from the coded radiation source. Alternately, the radiation detector can have a backside screen that emits light upon irradiation from the coded radiation source. The image on the backside of the radiation detector is captured by an imaging device such as a charge coupled detector (CCD) or an optical digital camera or any other similar silicon-based imager that is configured to generate an intermediate image. The intermediate image is a replica of the image. Thus, the radiation converter is imaged with a CCD or an equivalent imager to produce the intermediate image, which is an electronic version, I(x,y), of the analog encoded image at the radiation detector.

The intermediate image can be processed in the same manner as the image at the radiation detector of the first exemplary imaging apparatus to provide the same type of output data, i.e., at least one decoded image, multiple decoded images, and/or a three-dimensional image of the object. The same methods and the same machine-readable data storage devices can be employed as in the case of the first exemplary imaging apparatus upon substitution of the digital image at the radiation detector with the intermediate image generated by the CCD or the equivalent imager of the third exemplary imaging apparatus. While the at least one decoded image, the multiple decoded images, and/or the three-dimensional image of the object from the third exemplary imaging apparatus are based on the analog image at the radiation detector, the at least one decoded image, the multiple decoded images, and/or the three-dimensional image of the object are also based on, and are constructed directly from, i.e., constructed by manipulation of the digital data for, the intermediate image.

Figure 9:
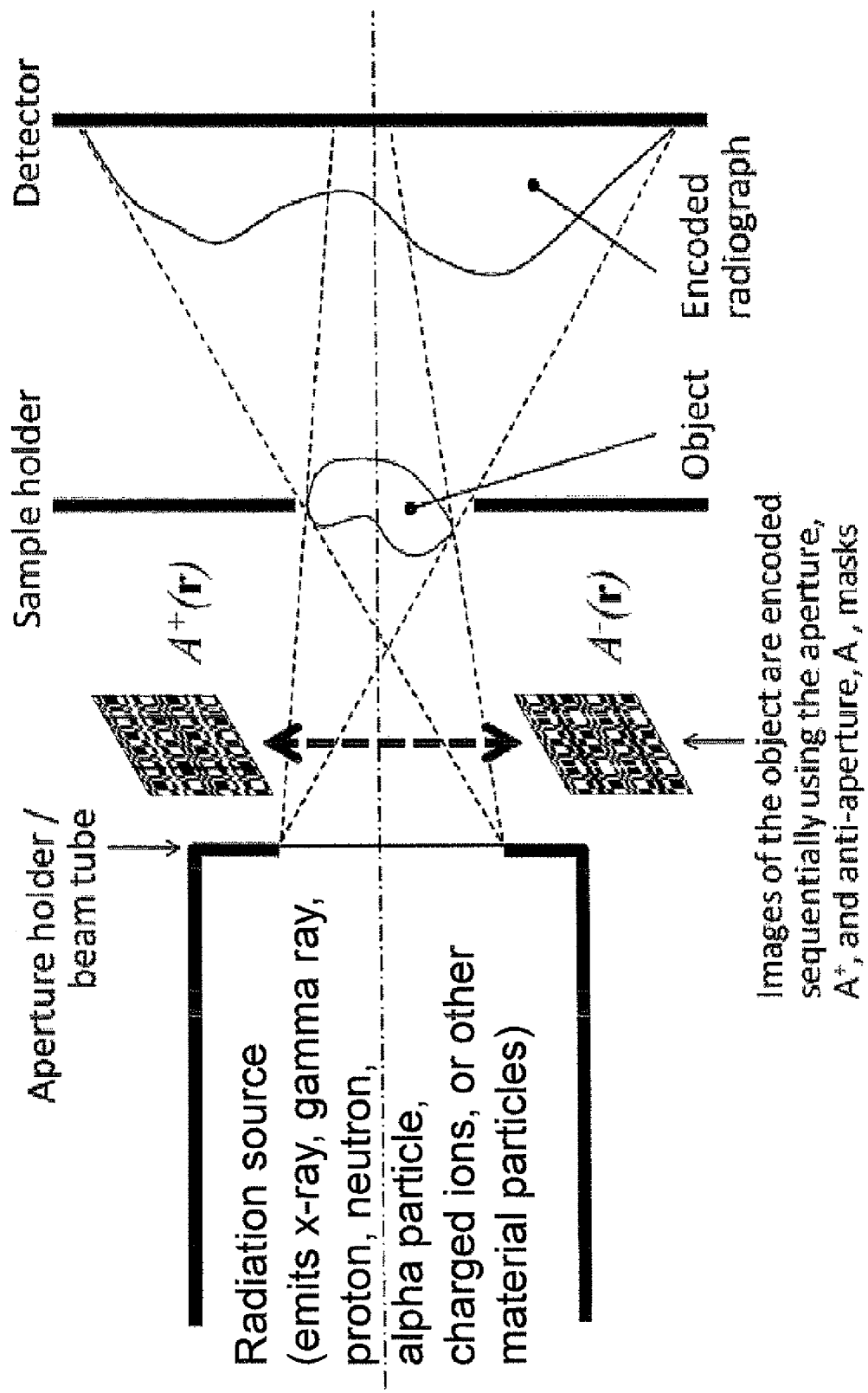
FIG. 9 is a schematic vertical cross-sectional view of a fourth exemplary imaging apparatus according to the present invention.

Referring to FIG. 9, a schematic vertical cross-sectional view of a fourth exemplary imaging apparatus according to the present invention is shown. The fourth exemplary imaging apparatus explicitly shows the general types of non-diffracting or refracting radiation of x-ray, gamma ray, proton, neutron, electron, alpha particle, charged ions, or other material particles. Variations of the fourth exemplary imaging apparatus to include a CCD or an equivalent imager are explicitly contemplated herein.

Figures 10A, 10B, 10C:
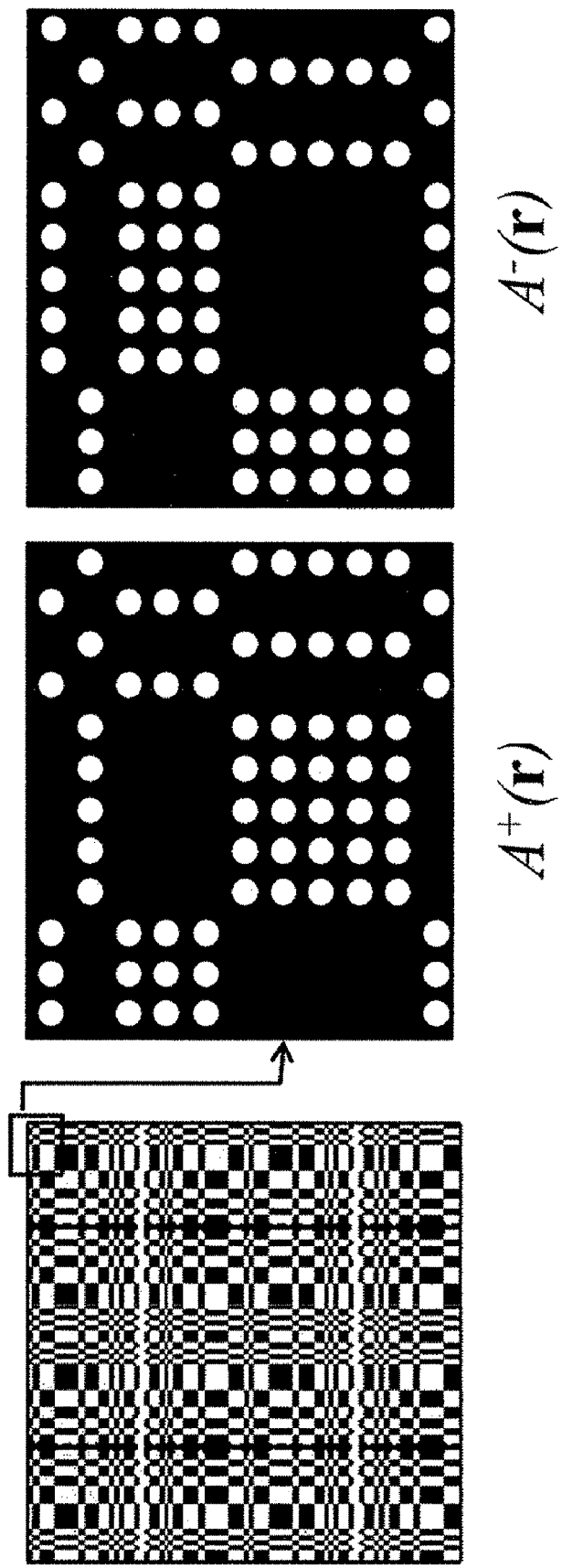
FIG. 10A is a coded aperture mask having an exemplary pattern of holes according to the present invention.
FIG. 10B is a magnified view of the coded aperture mask shown in FIG. 10A (in which discrete holes in the coded aperture mask are shown) according to the present invention.
FIG. 10C is a magnified view of a complementary coded aperture mask which includes a complementary pattern of the pattern shown in FIG. 10B.

Referring to FIGS. 10A-10C, patterns of holes in the coded aperture masks of the present invention are described in detail. FIG. 10A is an overall view of a particular URA coded aperture mask having an exemplary pattern of holes according to the present invention. FIG. 10B is a magnified view of the coded aperture mask shown in FIG. 8A showing discrete holes in the coded aperture mask. FIG. 10C is a magnified view of a complementary coded aperture mask which includes a complementary pattern of the pattern shown in FIG. 8B. FIGS. 10A and 10B shows a first coded aperture mask ("the aperture mask" or "the $A^+$ mask"), and FIG. 10C shows a second coded aperture mask ("the anti-aperture mask" or "the $A^-$ mask"). The first coded aperture mask of FIGS. 10A and 10B and the second coded aperture mask of FIG. 10C form a pair of complementarily coded aperture masks.

While any type of coded aperture mask can be formed by any method known in the art, a method of forming a Uniform Redundant Array (URA) mask (for an aperture mask and an anti-aperture mask) is described herein for illustrative purposes. The URA mask can be formed using an opaque substrate material that has been etched, mechanically or electrically drilled, or deposited using processes similar to those used for semiconductor processing. For example, a pair of an aperture mask and an anti-aperture mask can be constructed from a thin sheet of Cadmium (Cd) foil mounted in a structural frame of Aluminum and/or laminated to a thin Aluminum sheet. Cd foils of 0.25 mm thickness provide a thermal neutron transmission fraction of approximately 1%. Neutrons transmitted through the opaque regions of the aperture are also mitigated by using the aperture/anti-aperture method defined by Eq. (9). Micro hole drilling and micro electrical discharge machining (EDM) can readily produce a coded aperture mask having the size of 5 cm×5 cm and containing about 5,000 holes, each being as small as 50 microns in diameter.

An encoded neutron source of the present invention is likely to achieve L/D ratios on the order of 5,000 and higher and reconstruction resolutions significantly below 10 microns, L being the distance from the coded aperture mask to the object and D being typical dimensions of each hole in the coded aperture mask, reconstruction resolutions on the order of 10 micron or less is achievable. In comparison, the NIST Thermal Neutron Imaging Facility, which is representative of the highest spatial resolution achievable in the world today, achieves an image resolution on the order of 100 microns. Combination of the present invention with other image enhancing techniques such as neutron geometric magnification or use of smaller pixels may provide even higher resolution. The present invention allows efficient multi-pinhole neutron collection without using exotic detector materials or designs. Achieving high-resolution in radiography systems such as these would permit new types of measurements for applications such as microchannel heat exchangers (at a resolution better than 100 microns) or cellular microscopy (at a resolution better than 10 microns).

While the invention has been described in terms of specific embodiments, it is evident in view of the foregoing description that numerous alternatives, modifications and variations will be apparent to those skilled in the art. Other suitable modifications and adaptations of a variety of conditions and parameters normally encountered in molecular biology, protein chemistry, and protein modeling, obvious to those skilled in the art, are within the scope of this invention. All publications, patents, and patent applications cited herein are incorporated by reference in their entirety for all purposes to the same extent as if each individual publication, patent, or patent application were specifically and individually indicated to be so incorporated by reference. Accordingly, the invention is intended to encompass all such alternatives, modifications and variations which fall within the scope and spirit of the invention and the following claims.

What is claimed is:

1. An imaging apparatus comprising:
   a coded aperture mask having a set of multiple holes and configured to pass radiation from a radiation source through said set of multiple holes;
   a radiation detector located at an image plane at an opposite side of said radiation source relative to said coded aperture mask and configured to generate an image of an object placed between said coded aperture and said radiation detector; and
   an image decoder unit that constructs multiple decoded images based on said image, wherein each of said multiple decoded images is representative of a two-dimensional cross-sectional area of said object in a plane parallel to said imaging plane and located at different distances from said imaging plane.

2. The imaging apparatus of claim 1, wherein said image decoder unit is configured to generate a three-dimensional image of said object based on said multiple decoded images.

3. The imaging apparatus of claim 1, wherein said image decoder unit includes a microprocessor that decodes said image to construct said multiple decoded images upon execution of a program.

4. The imaging apparatus of claim 1, further comprising a sample holder located between said coded aperture mask and said radiation detector and configured to hold said object.

5. The imaging apparatus of claim 1, wherein said radiation detector is a charge coupled detector (CCD) or an optical digital camera.

6. The imaging apparatus of claim 1, wherein a surface of said radiation detector is parallel to said coded aperture mask.

7. The imaging apparatus of claim 1, wherein said coded aperture mask includes a uniform redundant array of pinholes, a random pinhole array of pinholes, or a Fresnel zone array of pinholes, or another type of array of pinholes.

8. The imaging apparatus of claim 1, wherein said apparatus is configured to allow removal of said coded aperture mask and to allow insertion of another coded aperture mask.

9. The imaging apparatus of claim 1, wherein said radiation source generates a radiation of neutrons, protons, alpha particles, electrons, a product of radioactive decay, X-ray, or gamma ray.

10. The imaging apparatus of claim 9, wherein said radiation source includes at least one scattering media that alters direction of said radiation within said radiation source to enhance dose of said radiation directed to said coded aperture mask.

11. The imaging apparatus of claim 1, wherein said radiation source is a nuclear reactor, a radioactive material, an X-ray source, or a particle accelerator.

12. The imaging apparatus of claim 1, further comprising a radiation shield, wherein said radiation shield and said coded aperture collectively enclose said radiation source to reduce background radiation from said radiation source.

13. The imaging apparatus of claim 1, wherein each hole in said set of multiple holes has a lateral dimension from 1 micron to 1 mm, and wherein said radiation detector is located at a distance from 3 cm to 30 m from said coded aperture mask.

14. The imaging apparatus of claim 1, wherein said radiation source emits neutrons and said radiation is a beam of neutrons.

15. An imaging apparatus comprising:
a coded aperture mask having a set of multiple holes and configured to pass radiation from a radiation source through said set of multiple holes;
a radiation detector located at an image plane at an opposite side of said radiation source relative to said coded aperture mask and configured to generate an image of an object placed between said coded aperture and said radiation detector; and
a charge coupled detector (CCD) or an optical digital camera configured to generate an intermediate image that is a replica of said image.

16. The imaging apparatus of claim 15, wherein said radiation detector is a scintillator array configured to detect said radiation.

17. The imaging apparatus of claim 15, wherein said image decoder unit is configured to construct said multiple decoded images based on said intermediate image.

18. A method of operating an imaging apparatus, said method comprising:
providing an imaging apparatus including a radiation source, a coded aperture mask having a set of multiple holes and configured to pass radiation from said radiation source through said set of multiple holes, and a radiation detector located at an image plane;
generating an image at said radiation detector of an object located between said coded aperture and said radiation detector; and
constructing multiple decoded images based on said image, wherein each of said multiple decoded images is representative of a two-dimensional cross-sectional area of said object in a plane parallel to said imaging plane and located at different distances from said imaging plane.

19. The method of claim 18, further comprising generating a three-dimensional image of said object based on said multiple decoded images.

20. The method of claim 18, wherein said multiple decoded images are constructed upon execution of a program on a microprocessor that is embedded in said image decoder unit.

21. The method of claim 18, wherein said image decoder unit constructs said multiple decoded images from said image at said radiation detector.

22. The method of claim 18, further comprising generating an intermediate image by capturing said image at said radiation detector with a charge coupled detector (CCD) or an optical digital camera, wherein said image decoder unit constructs said multiple decoded images from said intermediate image.

23. The method of claim 18, wherein said coded aperture mask includes a uniform redundant array of pinholes, a random pinhole array of pinholes, or a Fresnel zone array of pinholes.

24. The method of claim 18, wherein said radiation source generates a radiation of neutrons, protons, alpha particles, electrons, a product of radioactive decay, X-ray, or gamma ray.

25. A method of operating an imaging apparatus, said method comprising:
providing an imaging apparatus including a radiation source, a coded aperture mask having a set of multiple holes and configured to pass radiation from said radiation source through said set of multiple holes, and a radiation detector located at an image plane;
generating an image at said radiation detector of an object located between said coded aperture and said radiation detector;
replacing said coded aperture mask with a second coded aperture mask having a second set of multiple holes and configured to pass radiation from said radiation source through said second set of multiple holes; and
generating a second image at said radiation detector of said encoded object.

26. The method of claim 25, further comprising constructing at least one decoded image based on said image and said second image, wherein said at least one decoded image is representative of a physical shape of said object.

27. The method of claim 26, further comprising reducing background noise in said at least one decoded image by independently collecting from coded aperture mask and said second coded aperture mask encoded images at said radiation detector, wherein said encoded images are combined through summation prior to digital reconstruction to produce a noise-reduced decoded image.

28. The method of claim 25, wherein said second set of multiple holes in said second coded aperture mask and said set of multiple holes in said coded aperture mask have complementary patterns.

29. A non-transitory machine-readable data storage device embodying a program of machine-executable instructions to perform a method of operating an imaging apparatus, wherein said imaging apparatus comprises a radiation source, a coded aperture mask having multiple apertures and configured to pass radiation from said radiation source through said multiple apertures, and a radiation detector located at an image plane, and wherein said method comprises generating an image at said radiation detector of an object located between said coded aperture and said radiation detector and constructing multiple decoded images based on said image, wherein each of said multiple decoded images is representative of a two-dimensional cross-sectional area of said object in a plane parallel to said imaging plane and located at different distances from said imaging plane.

30. The non-transitory machine-readable data storage device of claim 29, wherein said machine-readable data storage device is a portable memory device that is readable by a computer.

31. The non-transitory machine-readable data storage device of claim 29, wherein said method further comprises generating a three-dimensional image of said object based on said multiple decoded images.

32. A non-transitory machine-readable data storage device embodying a program of machine-executable instructions to perform a method of operating an imaging apparatus, wherein said imaging apparatus comprises a radiation source, a coded aperture mask having multiple apertures and configured to pass radiation from said radiation source through said multiple apertures, and a radiation detector located at an image plane, and wherein said method comprises generating an image at said radiation detector of an object located between said coded aperture and said radiation detector and generating a second image at said radiation detector of said object, wherein said second image is generated after replacing said coded aperture mask with a second coded aperture mask having a second set of multiple holes.

33. The non-transitory machine-readable data storage device of claim 32, wherein said method further comprises constructing at least one decoded image based on said image and said second image, wherein said at least one decoded image is representative of a physical shape of said object.

34. The non-transitory machine-readable data storage device of claim 32, wherein said method further comprising reducing background noise in said at least one decoded image by comparing a first encoded imaged constructed from said image and a second encoded image constructed from said second image prior to summation and reconstruction of two independent encoded images to produce a decoded image.

* * * * *